June 4, 1968  C. W. BEAZER  3,386,257

STORAGE AND TRANSPORTATION OF COLD LIQUIDS

Filed Aug. 3, 1966  3 Sheets-Sheet 1

INVENTOR
C. W. BEAZER

BY *Young and Quigg*

ATTORNEYS

INVENTOR
C. W. BEAZER

BY *Young and Quigg*

ATTORNEYS

United States Patent Office 3,386,257
Patented June 4, 1968

3,386,257
STORAGE AND TRANSPORTATION OF COLD LIQUIDS
Charles W. Beazer, Bartlesville, Okla., assignor to Phillips Petroleum Company, a corporation of Delaware
Filed Aug. 3, 1966, Ser. No. 569,992
10 Claims. (Cl. 62—45)

ABSTRACT OF THE DISCLOSURE

In a vehicle for storing and transporting a cold liquid cargo at low temperatures, the tanks carried by the vehicle are stabilized therein against longitudinal and transverse movement by a system of keys and keyways attached to the side walls of said tanks and the adjacent structural members. Means are also provided for preventing vertical movement of said tanks.

---

This invention relates to the storage and transportation of cold liquids. In one aspect this invention relates to the storage and transportation of cold liquids in a tank mounted in or on a marine vessel. In another aspect this invention relates to the storage and transportation of cold liquids in a tank mounted in or on a land vehicle.

In recent years the quantity of liquefied gases transported by land vehicles and by water vehicles has increased. Such liquefied gases as liquefied natural gas (methane), other petroleum gases such as ethane, propane, butane, and mixtures thereof, as well as liquefied ammonia, hydrogen, nitrogen, helium, and the like, are now being transported in large quantities at substantially atmospheric pressure and subatmospheric temperatures. These practices have required the development of much specialized equipment.

One problem which has persisted in this field is the provision of a satisfactory means for stabilizing a tank mounted in or on a vehicle while still permitting thermal expansion and contraction of the shell of said tank. This problem arises due to the fact that the tank or tanks are installed in the vehicle at ambient temperature, but are reduced to much lower temperatures when filled with the cargo of liquefied gas. Such changes in temperature naturally result in considerabble contraction in the dimensions of the tanks when filled with a liquefied gas and in considerable expansion when said tanks are emptied and permitted to increase in temperature. These problems are particularly severe in marine vessels such as tankers, barges, etc., where the pitching and rolling movements of the vessel are more pronounced than on land vehicles. For this reason the invention will be described herein in terms of marine vessels. The invention provides a solution for the above-described problems.

An object of this invention is to provide a structure in a vehicle wherein a tank is mounted in or on said vehicle so as to be stationary with respect to said vehicle, but permitted to expand or contract responsive to temperature changes. Another object of this invention is to provide a mounting for tanks of large capacity in a marine vessel for transporting a cargo which must be maintained at extremely low temperatures, which mounting will permit movements of the tank walls responsive to the forces of expansion and contraction, but which maintain said tank as a whole in a predetermined position within or on said vessel regardless of the movements of the vessel on the surface of the water. Other aspects, objects, and advantages of the invention will be apparent to those skilled in the art in view of this disclosure.

Thus, according to the invention, there is provided an apparatus for storing and transporting a cold liquid cargo at a low temperature, comprising: a vehicle; a plurality of structural members defining a cargo cell in said vehicle; a tank disposed in said cargo cell with each side wall of said tank positioned adjacent one of said structural members; a first engaging means extending substantially horizontally from one of the adjacent surfaces of each said tank side wall and each said structural member which are adjacent each other; a second engaging means correspondingly located and extending substantially horizontally from the other of each of said adjacent surfaces; said first engaging means and said second engaging means being adapted to register with and engage each other to stabilize said tank with respect to transverse and longitudinal movement within said cell while permitting expansion and contraction of said tank; and means for preventing vertical movement of said tank within said cell.

It will be noted that the engaging means employed to stabilize said tank with respect to transverse and longitudinal movement are positioned on the side walls of the tank. This structure provides a number of important advantages. One important advantage is better support for the tank. When the tank is anchored at the bottom only there is a tendency for the upper portion of the tank, particularly in tall tanks, to move or lean. This is prevented when the tank is supported or stabilized from all four sides as in the practice of this invention. In one presently preferred manner of practicing the invention the tanks are supported at locations adjacent both the top and bottom thereof. Such methods of support result in better distribution of the stresses and forces exerted on the tank by the pitching and rolling movements of the vessel. Side wall support or stabilization of the tank also makes it possible to fabricate said tank from lighter weight materials.

Figure 1:
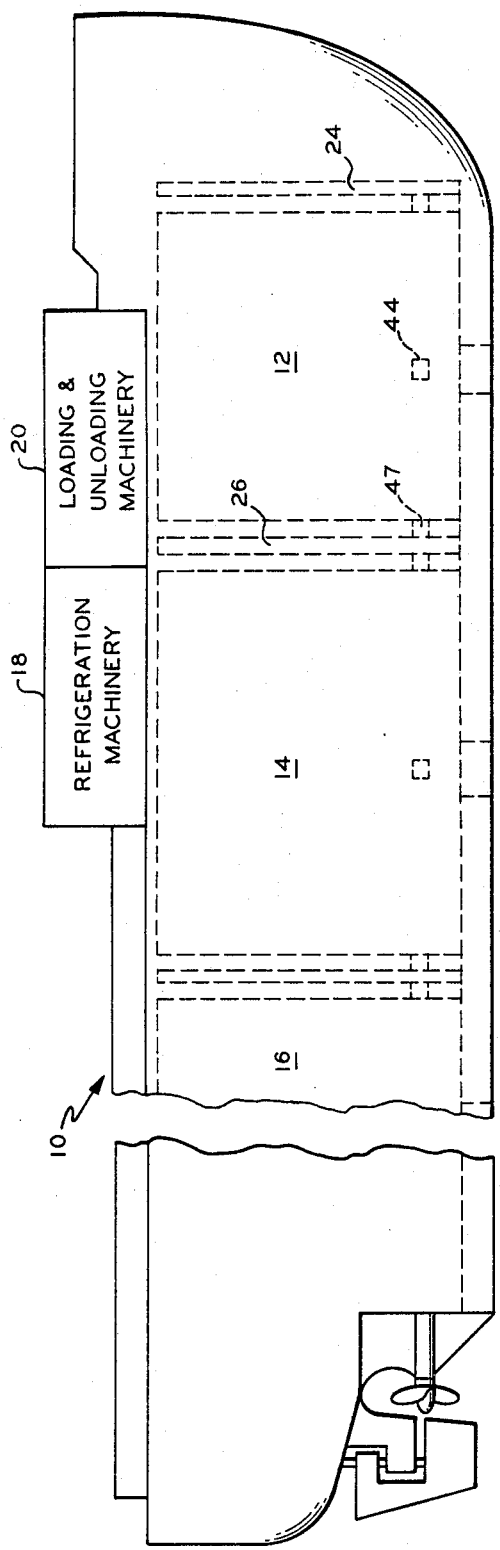
FIGURE 1 is a schematic elevation of a tanker showing the relative positions of a plurality of tanks provided for containing liquefied gases.

Referring now to the drawings wherein like reference numerals are employed to denote like elements, the invention will be more fully explained. In FIGURE 1 there is illustrated a tanker 10 provided with tanks 12, 14, and 16. Refrigeration machinery 18 and loading and unloading machinery 20 are conventional and need not be described in detail. Said tanker comprises a conventional tanker hull provided with the usual propulsion means and other conventional facilities.

Figure 2:
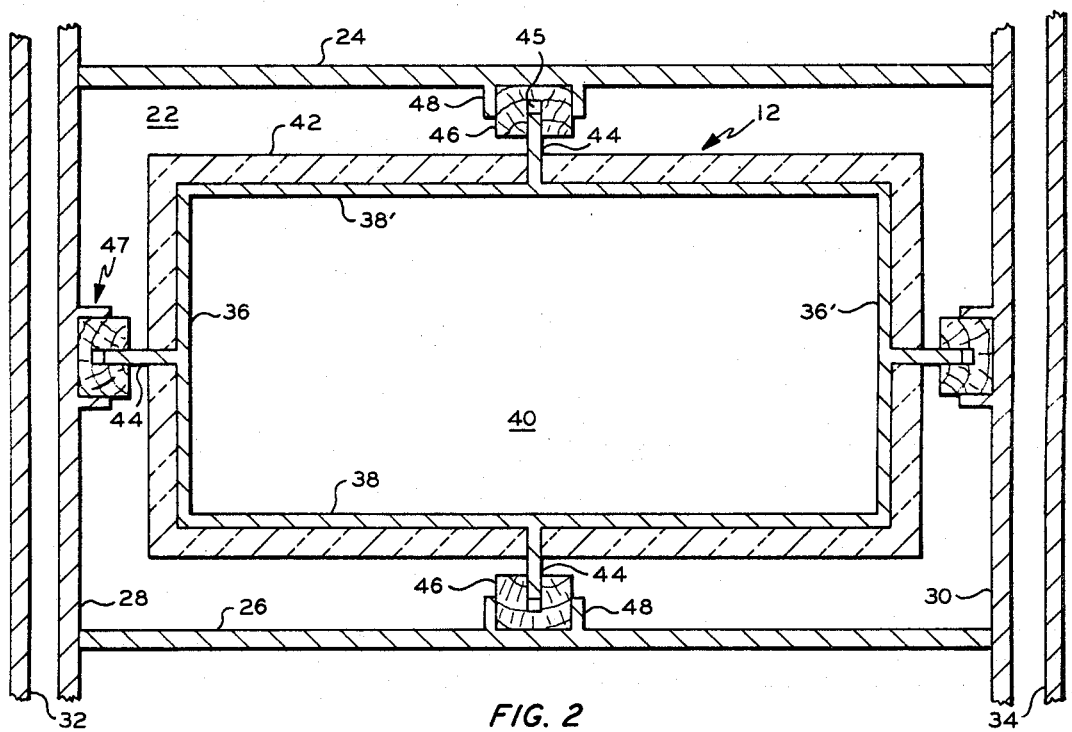
FIGURE 2 is a plan view in cross section of a tank of the vessel illustrated in FIGURE 1.

Referring now to FIGURE 2, there is shown a plan view in section of a tank in a tanker, such as tank 12 in tanker 10 of FIGURE 1. Said view is taken along about the vertical midpoint of the tank. In said FIGURE 2 tank 12 is shown disposed in a cargo cell 22 which is defined by a plurality of structural members comprising transverse members 24 and 26, and longitudinal members 28 and 30. Said longitudinal members 28 and 30 are sections of the inner hull of the tanker. Said transverse members 24 and 26 can be either cofferdams or bulkheads and extend between said longitudinal members 28 and 30. If desired, said transverse members 24 and 26 can extend beyond the inner hull of the vessel to the outer hull 32 and 34.

As shown in FIGURE 2, said tank 12 is a polygonal or prismatic tank comprised of a first pair of opposed generally vertically disposed spaced apart side walls 36 and 36' and a second pair of opposed generally vertically disposed side walls 38 and 38'. Said second side walls are joined to said first side walls at adjacent edges thereof. A bottom wall 40 connects the bottom edges of said side walls and forms the bottom of the tank. The outer surface of the tank is covered with a layer of thermal insulation 42.

It will be noted that each side wall of said tank is positioned adjacent one of said structural members 24, 26, 28, and 30. A first engaging means in the form of a key 44 comprising a tongue or bar extends substantially horizontally from each side wall of said tank. A second engaging means in the form of a keyway is correspondingly located and extends substantially horizontally from each of said structural members defining said cargo cell 22. As shown in FIGURE 2, said keyway comprises a block 46 of balsa wood or other suitable insulating material provided with a U-shaped recess 45 therein. Said block of balsa wood is suitably mounted between a pair of projections 48. A pair of said projections project from each of said structural members 24, 26, 28, and 30. In operation said tongue or bar registers with and slidably engages the U-shaped recess in block 46. By providing at least one of said keys and at least one corresponding keyway on all four sides of the tank, said tank is stabilized with respect to transverse and longitudinal movement within said cell, but said side walls 36, 36', 38 and 38' are free for natural expansion and contraction due to changes in temperature. Said key and said keyway can be located at any convenient position vertically with respect to the tank side walls and said structural members. When only one key and one keyway are provided per each tank side wall, it is generally preferred that they be located along the lower portion of the tank wall.

Figure 3:
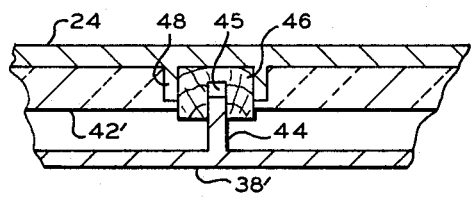
FIGURE 3 is a detail view in cross section showing a modification of the tank illustrated in FIGURE 2.

The apparatus of FIGURE 3 is a modification of the apparatus of FIGURE 2. Said apparatus in FIGURE 3 is like that in FIGURE 2 except that insulation 42' is provided on the inner surfaces of the structural members defining cargo cell 22 instead of the insulation 42 on the outer surface of tank 12.

Figure 4:
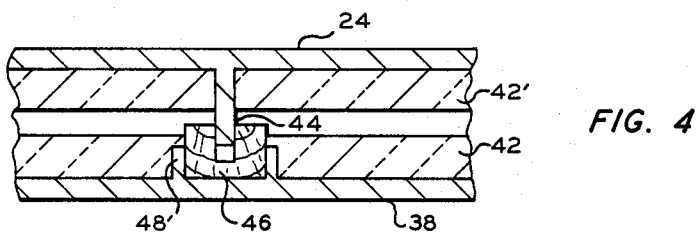
FIGURE 4 is a detail view in cross section showing another modification of the tank illustrated in FIGURE 2.

In the apparatus of FIGURE 4 the key 44' comprising the tongue or bar extends substantially horizontal from transverse structural member 24, and block 46' and projections 48' are provided on the wall 38' of the tank 12. It will also be noted that in FIGURE 4 two layers of insulation 42' and 42 are provided.

Figure 5:
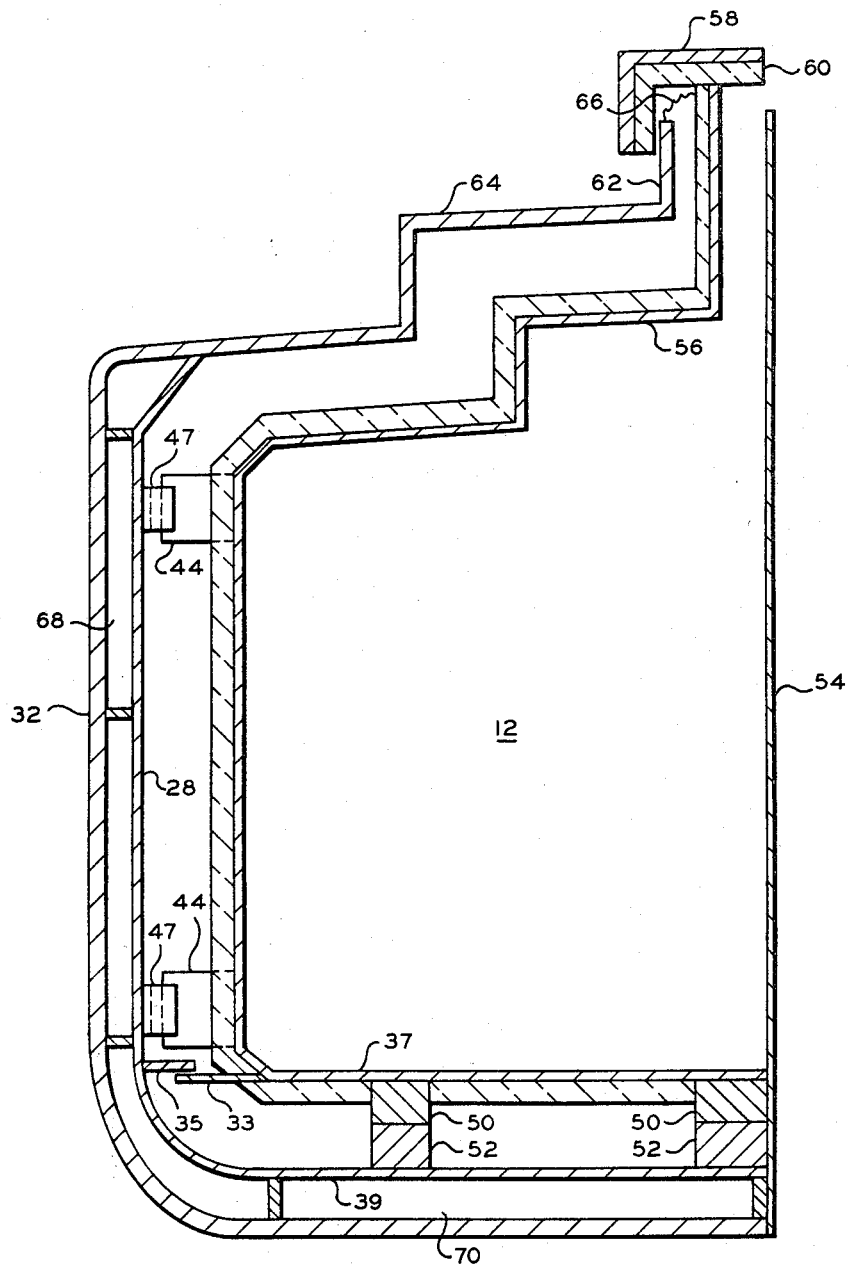
FIGURE 5 is a sectional elevation of one side of a tanker hull showing a liquefied gas cargo tank stabilized therein in accordance with the invention.

Referring now to FIGURE 5, there is shown in section one-half of a tank, such as tank 12 in tanker 10. The external surface of the bottom 37 of said tank has secured thereto a plurality of spaced support blocks 50 formed of a load-bearing insulation such as balsa wood or a resin. Corresponding support blocks 52, substantially square, of said load-bearing insulation are secured to the inner surface of the inner bottom 39 of the vessel. The surfaces of said blocks 50 and 52 register with each other in sliding contact and the bottom of said tank is thus free to expand or contract in either a lateral or longitudinal direction.

A bulkhead 54 is positioned vertically along the center longitudinal axis of the tank 12 so as to divide said tank into two sections, thereby reducing the free surface of the confined liquid. Said bulkhead 54 is not essential and has been omitted from FIGURE 2 in order to simplify the drawing. Said bulkhead 54 can be of any suitable height. If desired, the lower portion of said bulkhead can be perforated to provide communication between the two tank sections. Said tank sections can be provided with individual, or common, loading and unloading means, as desired.

The tank 12 terminates at the top in an opening 56 enclosed by a dome member 58 which is insulated on its inner surface as indicated at 60. Said dome 58 is secured by conventional means (not shown) to an upwardly extending projection 62 of the deck structure 64 of the vessel 10. Neck 56 is sealed to member 62 by means of a flexible metal diaphragm 66. Ballast tanks 68 and fuel oil tanks 70 are provided between the two hulls of the ship in conventional manner.

FIGURE 5 illustrates one presently preferred manner of stabilizing a tank in accordance with the invention. In FIGURE 5 each side wall of said tank 12 is provided with a first engaging means which comprises a pair of spaced apart keys 44 (bars) which extend substantially horizontally from said side wall. One of said keys extends from the upper portion of the side wall and the other of said keys extends from the lower portion of said side wall. The second engaging means comprises a corresponding pair of spaced apart keyways 47, one of which extends substantially horizontally from the upper portion of the adjacent structural member 28 and the other of which extends substantially horizontally from the lower portion of said adjacent structural member, here the inner hull of the vessel. Said first engaging means can comprise a key or bar 44 as illustrated in FIGURE 2. Said second engaging means can comprise a block, such as block 46 in FIGURE 2, formed of balsa wood or other insulating material. The recess in keyway 47 is preferably of such size as to provide a loose sliding fit for key 44. However, it is within the scope of the invention for said recess to be larger in size. The depth of said recess is sufficient to accommodate the full penetration of key 44 caused by maximum expansion of tank 12. Similarly, the horizontal length of key 44 is such that on maximum contraction of tank 12 said key 44 will still extend into recess 45. Key 44 and keyway 47 can be elongated vertically. Thus, it is within the scope of the invention for said key and keyway to extend substantially the length of the tank side walls.

In marine vessels provided with independent cargo tanks such as here described, it is necessary that means be provided for preventing said tanks from floating in the event the hull of the ship is ruptured. This is usually accomplished by providing a hold-down means. Said hold-down means is intended to prevent vertical movement of the tank as a whole but to leave the walls of said tank free to expand vertically. FIGURE 5 also illustrates one presently preferred type of hold-down means which can be employed for this purpose. Said hold-down means comprises a first bar or member 33 which extends outwardly from the bottom wall of the tank 12, and a second bar 35 which extends inwardly from inner hull 28 and overlaps said first bar 33. A plurality of such devices spaced as desired around said tank can be provided.

Figure 6:
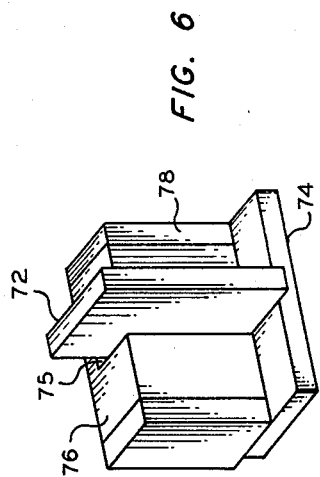
FIGURE 6 is a perspective view of one form of combination key, keyway, and hold-down means in accordance with the invention.

While a hold-down means is employed in the practice of the invention, the invention is not limited to employing any particular type of hold-down means. Any suitable type for preventing vertical movement of the tank as a whole can be employed. FIGURE 6, described hereinafter, comprises another type of hold-down means. Still another type of hold-down means can comprise a block or bar of suitable size placed between the top of the tank and deck 64 of the vessel and suitably connected to said tank top and said deck.

Referring now to FIGURE 6, there is shown a modification of the key and keyway engaging means of the invention. In FIGURE 6 said key comprises an inverted generally T-shaped member having a vertical bar 72 and a cross bar 74. Said keyway comprises a generally U-shaped recess 75 formed in a block 76 which can be balsa wood or any other suitable insulating material, similarly as shown in FIGURE 2. Said block 76 can be positioned between a pair of retaining members 78, similarly as in FIGURE 2. Or, if desired, said block can be a unitary structure comprised of any suitable material, such as a suitable metal. In operation, said block 76 is secured to either one or the other of the adjacent surfaces of an adjacent structural member and an adjacent side wall of the tank as described above, and said key member is secured to the other of said adjacent surfaces for register with and engagement with said keyway member. The modification illustrated in FIGURE 6 comprises a combination key, keyway, and hold-down member. Said combination member can be employed in any of the positions where the above-described key 44 and keyway can be employed. However, said combination key, keyway, and hold-down member is particularly adapted to be employed on the lower portion of the tank side wall, e.g., especially adjacent the tank bottom.

The cargo tanks will be fabricated from a low-temperature-resistant metal. A low temperature-resistant metal is one that retains a substantial amount of its strength at the low temperature experienced in use. Any suitable material can be employed. One presently preferred metal is 18–8 type stainless steel. Other materials which are suitable for service in a liquefied natural gas (LNG) ship at —250° to —260° F. are the so-called "9-nickel" steels, aluminum, and certain aluminum alloys such as aluminum-magnesium alloys. For service in an LNG ship 18–8 type stainless steel is frequently preferred because welding of this metal can be easily accomplished by conventional means with a minimum of welder and procedure qualifications and with no need for stress relieving. The self-supporting, independent cargo tanks are supported on the inner bottom of the tanker by a series of pedestals or blocks of load-bearing insulation. This insulation can be wood or a resin which is not subject to cold flow, such as a phenolic resin and a melamine resin laminated with fibers or glass or asbestos. The blocks of insulation will operate in pairs, one block being secured to the tank and the matching block being secured to the inner bottom of the ship so that the blocks are free to slide against each other to adjust to thermal changes.

Since the weight of the cargo tanks and their contents is carried on pedestals resting on the false bottom of the ship, complete freedom is provided for the use on the tank walls of whatever insulation material is proved to be the best from the standpoint of heat conductivity, resistance to fire and freedom from mechanical breakdown. The preferred insulation is approximately 12 inches of foamed polyurethane. This insulation can be either foamed in place or built up in blocks depending on the preferred practice in the building yard. The insulation will be held in place by stainless steel studs welded to the ship inner hull surface, with joints sealed by suitable mastic materials in the case of block application. Also, in the case of block application, insulation is applied in at least two layers with stainless steel studs holding the inner insulation layer against the ship inner hull and the outer layer is held in place by stainless steel studs imbedded in the blocks in the inner insulation layer.

The void space surrounding the cargo tanks, e.g., between the outer tank wall and the insulation, can be filled with nitrogen or other inert or essentially inert gas. Nitrogen can be produced on board by a commercial-type nitrogen generator. The inert or essentially inert gases are dried to prevent condensation on surfaces exposed in the void spaces. The gas in the void spaces is tested continuously or intermittently so as to detect cargo tank leakage if such should occur.

While the invention has been described with particular reference to marine vessels, the invention is not so limited. The invention is also applicable to land vehicles, for example, large transport trucks.

Also, while the invention has been described with particular reference to double hull tankers provided with a plurality of independent polygonal or prismatic cargo tanks, the invention is not so limited. As will be clear to those skilled in the art in view of this disclosure, the invention is applicable to single hull vessels. The invention is also applicable to vessels containing only one tank, such as small barges, etc. While prismatic or polygonal tanks having side walls which are substantially flat or straight are preferred for economy of space, it is within the scope of the invention to employ tanks of other shapes, e.g., cylindrical. The invention is also applicable to vessels provided with double wall tanks.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An apparatus for storing and transporting a cold liquid cargo at a low temperature, comprising: a vehicle; a plurality of structural members defining a cargo cell in said vehicle; a tank disposed in said cargo cell with each side wall of said tank positioned adjacent one of said structural members; a first engaging means extending substantially horizontally from one of the adjacent surfaces of each said tank side wall and each said structural member which are adjacent each other; a second engaging means correspondingly located and extending substantially horizontally from the other of each of said adjacent surfaces; said first engaging means and said second engaging means being adapted to register with and engage each other to stabilize said tank with respect to transverse and longitudinal movement within said cell while permitting expansion and contraction of said tank; and means positioned at the lower portion of at least one side wall of said tank for preventing vertical movement of said tank within said cell.

2. An apparatus according to claim 1 wherein: said tank is prismatic and comprises a first pair of opposed generally vertically disposed spaced apart side walls and a second pair of opposed generally vertically disposed side walls, said second side walls being joined to said first side walls at adjacent edges thereof, and a bottom wall connecting the bottom edges of said side walls and forming the bottom of the tank; said first engaging means comprises at least one key extending from each said side wall; and said second engaging means comprises at least one keyway extending from each said adjacent structural member.

3. An apparatus according to claim 1 wherein: said tank is prismatic and comprises a first pair of opposed generally vertical disposed spaced apart side walls and a second pair of opposed generally vertically disposed side walls, said second side walls being joined to said first side walls at adjacent edges thereof, and a bottom wall connecting the bottom edges of said side walls and forming the bottom of the tank; said first engaging means comprises at least one keyway extending from each said side wall; and said second engaging means comprises at least one key extending from each said adjacent structural member.

4. An apparatus according to claim 2 wherein: said first engaging means comprises a pair of spaced apart keys, one of said keys extending from the upper portion of each said side wall and the other of said keys extending from the lower portion of each said side wall; and said second engaging means comprises a corresponding pair of spaced apart keyways, one of said keyways extending from the upper portion of each said adjacent structural member and the other of said keyways extending from the lower portion of each said adjacent structural member.

5. An apparatus according to claim 3 wherein: said first engaging means comprises a pair of spaced apart keys, one of said keys extending from the upper portion of each said adjacent structural member and the other of said keys extending from the lower portion of each said adjacent structural member; and said second engaging means comprises a corresponding pair of spaced apart keyways, one of said keyways extending from the upper portion of each said side wall and the other of said keyways extending from the lower portion of each said side wall.

6. An apparatus according to claim 1 wherein said means for preventing vertical movement of said tank comprises a first bar extending outwardly from a side wall of said tank and a second bar extending inwardly from an adjacent structural member and overlapping said first bar.

7. An apparatus according to claim 4 wherein: said vehicle is a marine vessel; said structural members are comprised of the hull of said vessel and transverse members connecting opposite walls of said hull; each of said keyways comprises a generally U-shaped recess formed in a block secured to one of said structural members; each of said lower keys comprises an inverted generally T-shaped member secured to an adjacent side wall; and the vertical bar of said T-shaped member is slidably positioned in said recess and the cross bar of said T-shaped member is positioned under said block.

8. An apparatus according to claim 5 wherein: said vehicle is a marine vessel; said structural members are comprised of the hull of said vessel and transverse members connecting opposite walls of said hull; each of said keyways comprises a generally U-shaped recess formed in a block secured to one of said side walls; each of said lower keys comprises an inverted generally T-shaped member secured to an adjacent structural member; and the vertical bar of said T-shaped member is slidably positioned in said recess and the cross bar of said T-shaped member is positioned under said block.

9. An apparatus according to claim 7 wherein said vessel has an inner hull and an outer hull, said structural members are comprised of said inner hull and transverse members connecting opposite walls of said hull, and wherein each of said U-shaped recesses is formed in a block of balsa wood.

10. An apparatus according to claim 8 wherein said vessel has an inner hull and an outer hull, said structural members are comprised of said inner hull and transverse members connecting opposite walls of said hull, and wherein each of said U-shaped recesses is formed in a block of balsa wood.

References Cited

UNITED STATES PATENTS

| | | | |
|---|---|---|---|
| 3,312,076 | 4/1967 | Clarke et al. | 62—55 |
| 3,319,431 | 5/1967 | Clarke et al. | 62—55 X |

LLOYD L. KING, *Primary Examiner.*